United States Patent [19]
Verhulst et al.
[11] Patent Number: 4,677,807
[45] Date of Patent: Jul. 7, 1987

[54] SYSTEM FOR AUTOMATICALLY ENVELOPING A LARGE ROUND BALE WITH A WRAPPING

[75] Inventors: Michael J. Verhulst; Henry D. Anstey, both of Ottumwa, Iowa

[73] Assignee: Deere & Company, Moline, Ill.

[21] Appl. No.: 883,791

[22] Filed: Jul. 8, 1986

[51] Int. Cl.[4] ........ B65B 11/04
[52] U.S. Cl. ........ 53/118; 53/135; 53/176; 53/587
[58] Field of Search ........ 53/118, 135, 172, 176, 53/587; 100/5, 88; 56/341

[56] References Cited

U.S. PATENT DOCUMENTS

| | | | |
|---|---|---|---|
| 2,615,290 | 10/1952 | Dyken | 53/118 |
| 4,457,226 | 7/1984 | Meiers | 100/5 |
| 4,483,247 | 11/1984 | Coeffic | 100/88 |

FOREIGN PATENT DOCUMENTS

| | | | |
|---|---|---|---|
| 3429203 | 2/1986 | Fed. Rep. of Germany | 100/88 |
| 2146947 | 5/1985 | United Kingdom | 100/5 |

OTHER PUBLICATIONS

Power Farming Magazine, "Round Baler Review", Mar. 1986.

*Primary Examiner*—John Sipos

[57] ABSTRACT

An optional mechanism for enveloping a bale, in the bale chamber of a large round baler, with a wrapping material such as plastic sheet or net is provided on a baler having an automatic twine tie mechanism. The optional mechanism is embodied such that it utilizes mechanical and hydraulic controls of the twine tie mechanism for effecting automatic engagement of a normally disengaged drive roll drive for feeding wrap material into the bale chamber in response to a bale reaching a desired diameter in the chamber and for automatically severing the wrap material once a length thereof sufficient for encompassing a bale a desired amount has been disposed as determined by the time it takes a speed-controlled hydraulically operated twine arm to swing from one side to the other of the bale chamber.

7 Claims, 11 Drawing Figures

100
A
B
C
146
156
150
148
164
166
168
144
160
162
158
152
118
120
140
142
132
122
124
126
130
134
128
136
138
114
154
108
112

20
22
200
202
204
206
208
210
212
214
216
218
220
222
224
226
228
230
232
234
236
238
240
242
244
246
256
258
260
262
264
266
268
270
272
274
276
278
292
332
334
336
342
38
40

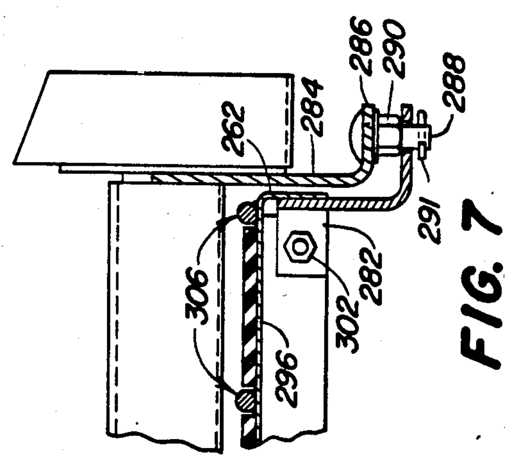
FIG. 7
286
290
288
284
262
291
306
282
302
296
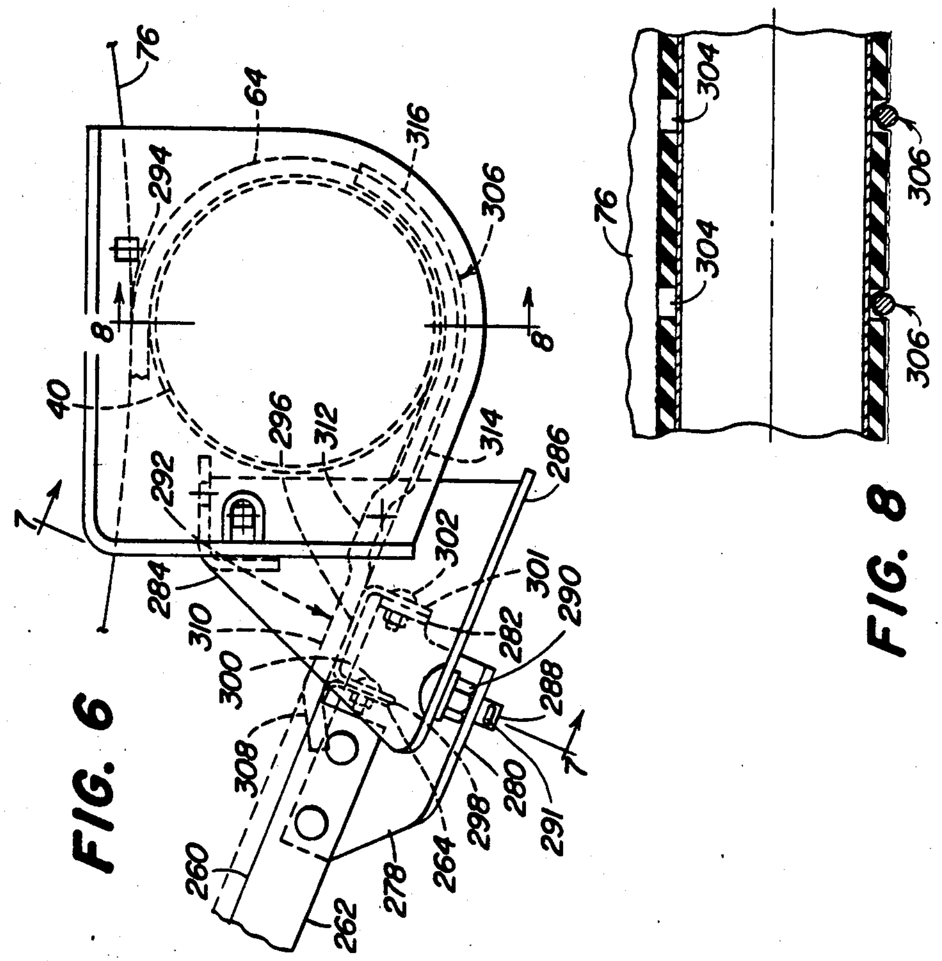
FIG. 6
FIG. 8
76
64
316
306
294
8
40
296
312
314
286
292
7
302
301
284
310
282
290
300
288
308
280
298
291
264
260
278
262
304
306

376
38
64
332
346
336
328
320
F
344
262
338
340
380
260
258
322
334
326
266
324
330
244
348
364
354
362
246
374
350
356
372
360
352
378
358
368
370
366

38
332
336
346
382
380
328
354
340
352
322
326
362
334
348
364
378
338
344
258
360
358
244
366
370
368
372
356
350
246
374

SYSTEM FOR AUTOMATICALLY ENVELOPING A LARGE ROUND BALE WITH A WRAPPING

RELATED APPLICATIONS

On a data even with the filing date of the instant application, the following commonly assigned applications were filed for covering inventions disclosed in this application:

1. Application Ser. No. 883,196 filed in the names of Frimml et al and entitled WRAP MATERIAL STRIPPER AND GUIDE ASSEMBLY.
2. Application Ser. No. 883,794 filed in the names of Anstey et al and entitled MECHANISM FOR FEEDING WRAP MATERIAL INTO A BALE-FORMING CHAMBER FOR ENVELOPING A LARGE ROUND BALE.
3. Application Ser. No. 883,793 filed in the name of Frerich and entitled HOUSING FOR HOLDING A SUPPLY ROLL OF LARGE ROUND BALE WRAP MATERIAL.
4. Application Ser. No. 883,239 filed in the names of Verhulst et al and entitled ASSEMBLY FOR GUIDING WRAP MATERIAL FROM THE REAR OF A BALER TO A BALE-FORMING CHAMBER INLET.

BACKGROUND OF THE INVENTION

The present invention relates to a large round baler having devices for wrapping a bale formed in the bale chamber thereof with either twine or a wrapping material such as plastic sheeting or net, for example.

Heretofore, the most common practice has been to provide as standard equipment a first device for wrapping a bale with twine and to provide as optional equipment a second device for wrapping a bale with plastic sheeting, net or the like. Usually these devices include separate control systems.

SUMMARY OF THE INVENTION

According to the present invention, an optional device for applying wrapping material such as plastic sheeting or net to a bale is provided for use on a round baler having a twine wrapping mechanism incorporating an automatic control system of the type disclosed in U.S. Pat. No. 4,457,226 granted to Gerald F. Meiers on July 3, 1984.

An object of the invention is to provide, in conjunction with a hydraulically operated twine wrapping apparatus, a device for applying an alternate type of wrapping to a bale and which employs the controls of the twine wrapping apparatus.

A further object is to provide a device, for applying wrapping such as plastic sheet or net to a bale, which includes a hydraulic cylinder for controlling the dispensing of a desired length of wrapping material, the cylinder being coupled to the control system for automatically controlling the wrapping of a bale with twine in such a way as to be responsive to a bale reaching a desired size within the bale-forming chamber for initiating a wrapping cycle.

Yet another object is to provide a device for applying wrapping such as plastic sheet or net to a formed bale designed such that it may be incorporated into a system for controlling the application of twine to a bale while requiring very little modification to such system.

These and other objects will become apparent from a reading of the ensuing description together with the appended drawings.

BRIEF DESCRIPTION OF THE DRAWINGS

FIG. 6 is a right side elevational view showing the wrap material guide finger assembly and its mounting to the forward end of the wrap material guide pan.

FIG. 7 is a sectional view taken along line 7—7 of FIG. 6.

FIG. 8 is a sectional view taken along line 8—8 of FIG. 6.

DESCRIPTION OF THE PREFERRED EMBODIMENT

The description hereinafter may refer to certain components as occurring in pairs when only the right component is visible. It is to be understood that the left component is similar in construction to the one shown.

Figure 1:
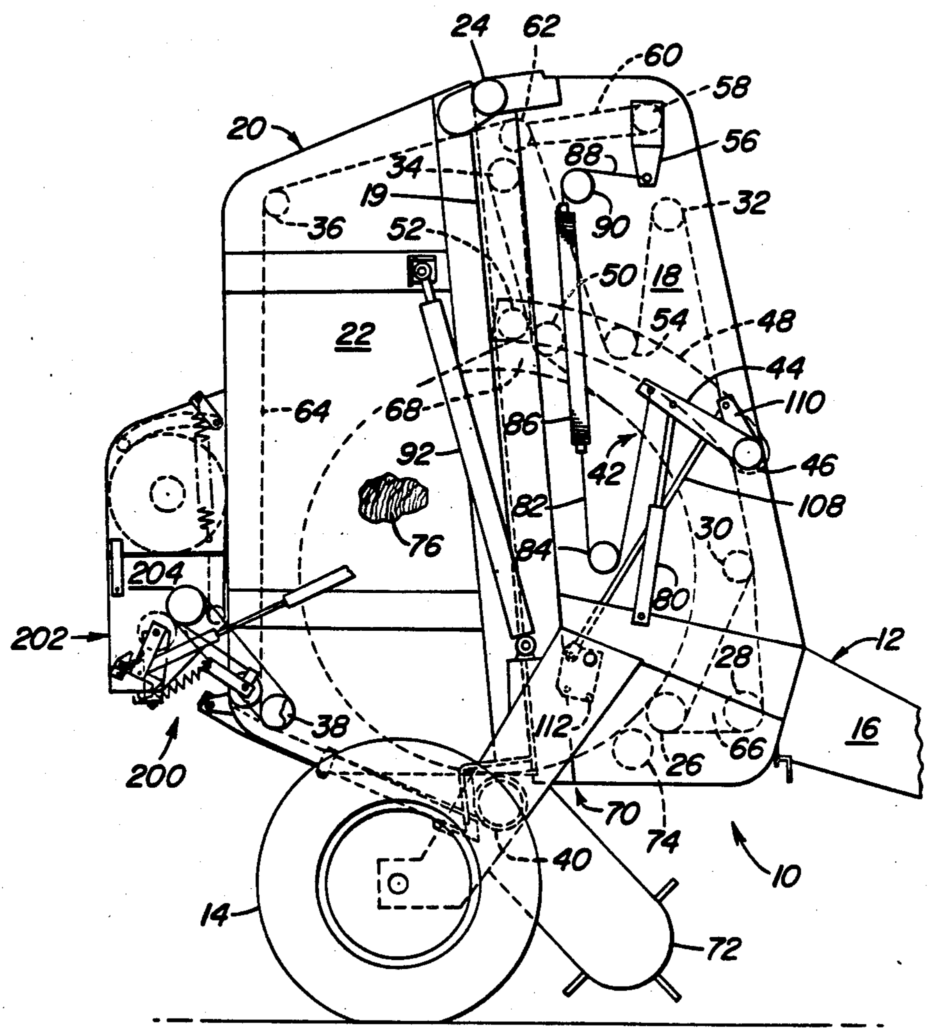
FIG. 1 is a right side elevational view of a large round baler embodying a wrapping system constructed in accordance with the principles of the present invention.

Referring now to FIG. 1, there is shown a large round baler 10 including a main frame 12 supported on a pair of ground wheels 14 and having a draft tongue 16 projecting forwardly therefrom for attachment to a tractor. Upstanding from and integral with the frame 12 is a pair of fore-and-aft extending, laterally spaced sidewalls 18 terminating in an upright rear edge 19. A gate 20 including a pair of sidewalls 22 respectively aligned with the sidewalls 18 closes an opening defined between the rear edges 19 and has an upper forward portion coupled by a horizontal transverse pivot 24 to an upper rear portion of the sidewalls 18 whereby the gate may swing vertically upwardly from its closed position shown in FIG. 1 to a bale discharge position, as is well-known in the art.

The fixed sidewalls 18 and the gate sidewalls 22 cooperate in supporting a plurality of bale-forming belt support rolls and belt tensioning rolls so as to form an expansible bale chamber between the sidewalls. Specifically, beginning with the lower rear support roll carried by the sidewalls 18 and proceeding counterclockwise the sidewalls 18 carry support rolls 26, 28, 30, 32 and 34 and the sidewalls 22 carry support rolls 36, 38 and 40. A belt tensioning mechanism 42 is mounted on the sidewalls 18 and includes a first pair of tensioning arms 44 respectively located exteriorly of the sidewalls 18 and fixed to opposite ends of a shaft 46 extending between and mounted for rotation in a central front location of the sidewalls 18. Fixed to the shaft 46 at respective locations interiorly of the sidewalls 18 is a pair of rearwardly extending, tensioning roll support arms 48. Extending between and rotatably mounted in a rear end portion of the arms 48 is a set of closely spaced rolls 50 and 52 and extending between and rotatably mounted in a central portion of the arms 48 is another roll 54. Another pair of tension arms 56 is respectively located exteriorly of the sidewalls 18 and fixed to opposite ends of a shaft 58 rotatably mounted in a upper forward location of the sidewalls. A further pair of rearwardly extending tensioning roll support arms 60 is respectively located interiorly of the sidewalls 18 and extending between and rotatably mounted in rear ends of the arms 60 is another tensioning roll 62.

A plurality of belts 64 are supported in side-by-side relationship across the various rolls with the exception that some of the belts skip the roll 28 and thus go directly between rolls 26 and 30 to form gaps, not shown, to permit the escape of stray crop from a zone 66 enclosed by the belts outside a bale chamber 68 defined by the belts. Specifically beginning with the roll 26, the belts 64 extend either forwardly to the support roll 28 or upwardly and forwardly to the support roll 30. From the support roll 30 the belts 64 extend upwardly to the support roll 32, downwardly to the tensioning roll 54, upwardly to the tensioning roll 62, rearwardly to the support roll 36, downwardly to the support roll 38, forwardly to the support roll 40, upwardly between the tensioning rolls 50 and 52 and then further upwardly to the support roll 34 then downwardly between the tensioning rolls 50 and 52 and then to the roll 26. Thus, it will be appreciated that the tensioning rolls 50 and 52 cooperate to close the top of the chamber 68 while the bottom of the chamber has an inlet 70 defined between the support rolls 26 and 40. Provided for delivering crop from a windrow to the bale chamber inlet 70 is a pickup 72.

Crop delivered through the inlet is caused to be rolled into a round bale by action of the belts 64 which are driven by virtue of their contact with roll 26 which is, as viewed in FIG. 1, driven in the counterclockwise direction. A starting roll 74 located adjacent the roll 26 is driven clockwise and cooperates with the belts to start the rolling up of a bale 76 within the chamber 68. To provide tension to the belts 64 to resist the growth of the bale 76 within the chamber 68, the tensioning mechanism 42 includes a pair of hydraulic tensioning cylinders 80, respectively coupled between the pair of tensioning arms 44 and the frame 12. A lower pair of chains 82 is respectively looped about a pair of lower sprockets 84 mounted to the sidewalls 18, with respective first ends of the chains being coupled to the respective rear ends of the pair of arms 44 and with second ends of the pair of chains being respectively coupled to lower ends of a pair of tension springs 86. A second pair of chains 88 is respectively looped about a pair of upper sprockets 90 mounted to the sidewalls 18 at locations spaced above the sprockets 84 with first ends of the chains being respectively coupled to the pair of tension arms 56 and with second ends of the chains being respectively coupled to upper ends of the pair of tension springs 86. Once the bale 76 has reached a desired size, it is bound with a desired wrapping in a manner described below and then discharged by operating a pair of hydraulic gate actuators 92 respectively coupled between the gate sidewalls 22 and the frame 12.

Figure 2:
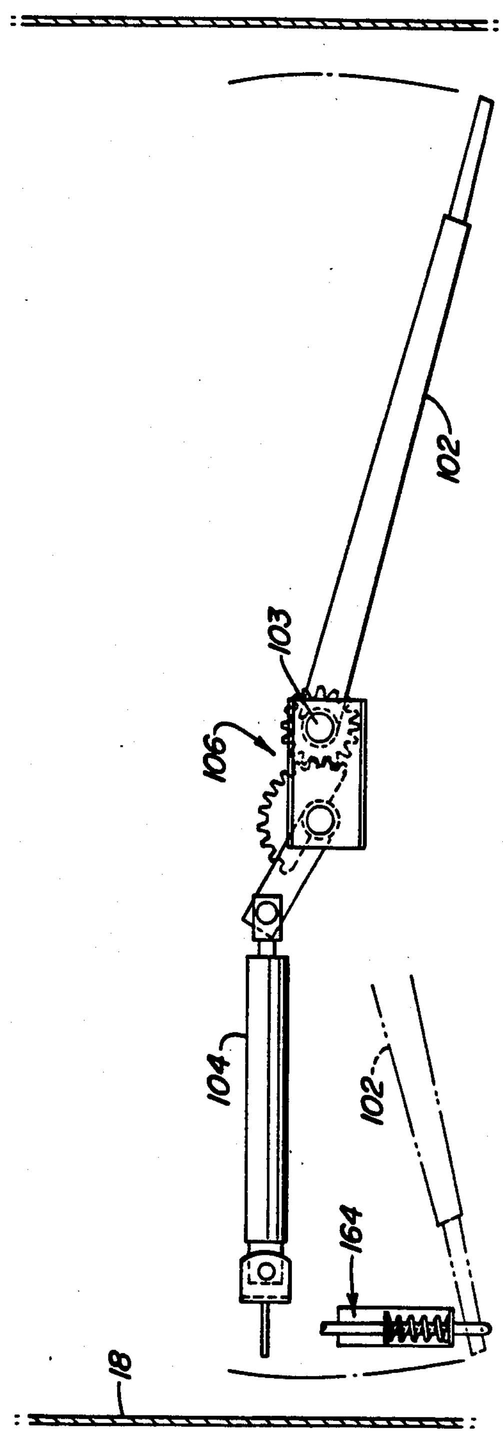
FIG. 2 is a top view showing the twine arm and its drive structure and also showing a portion of the reversing valve control rod.
Figure 3:
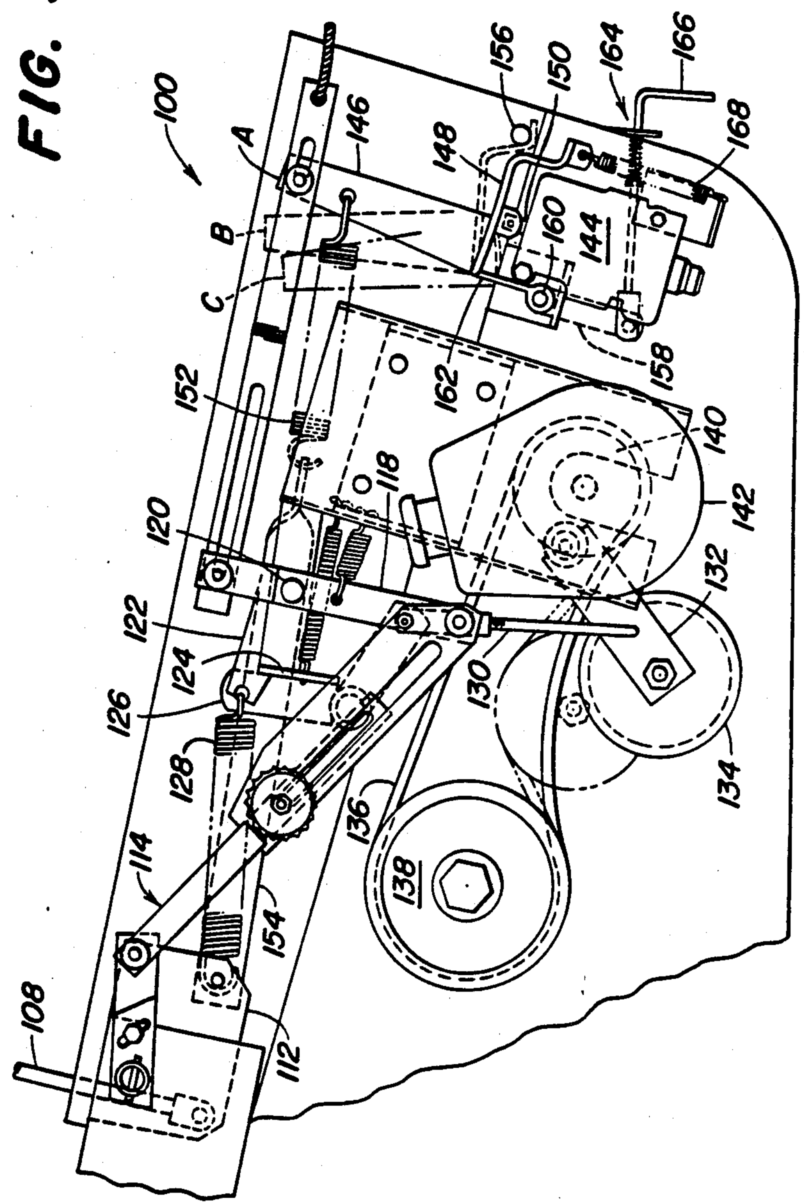
FIG. 3 is a right side elevational view of the twine wrap drive mechanism.
Figure 4:
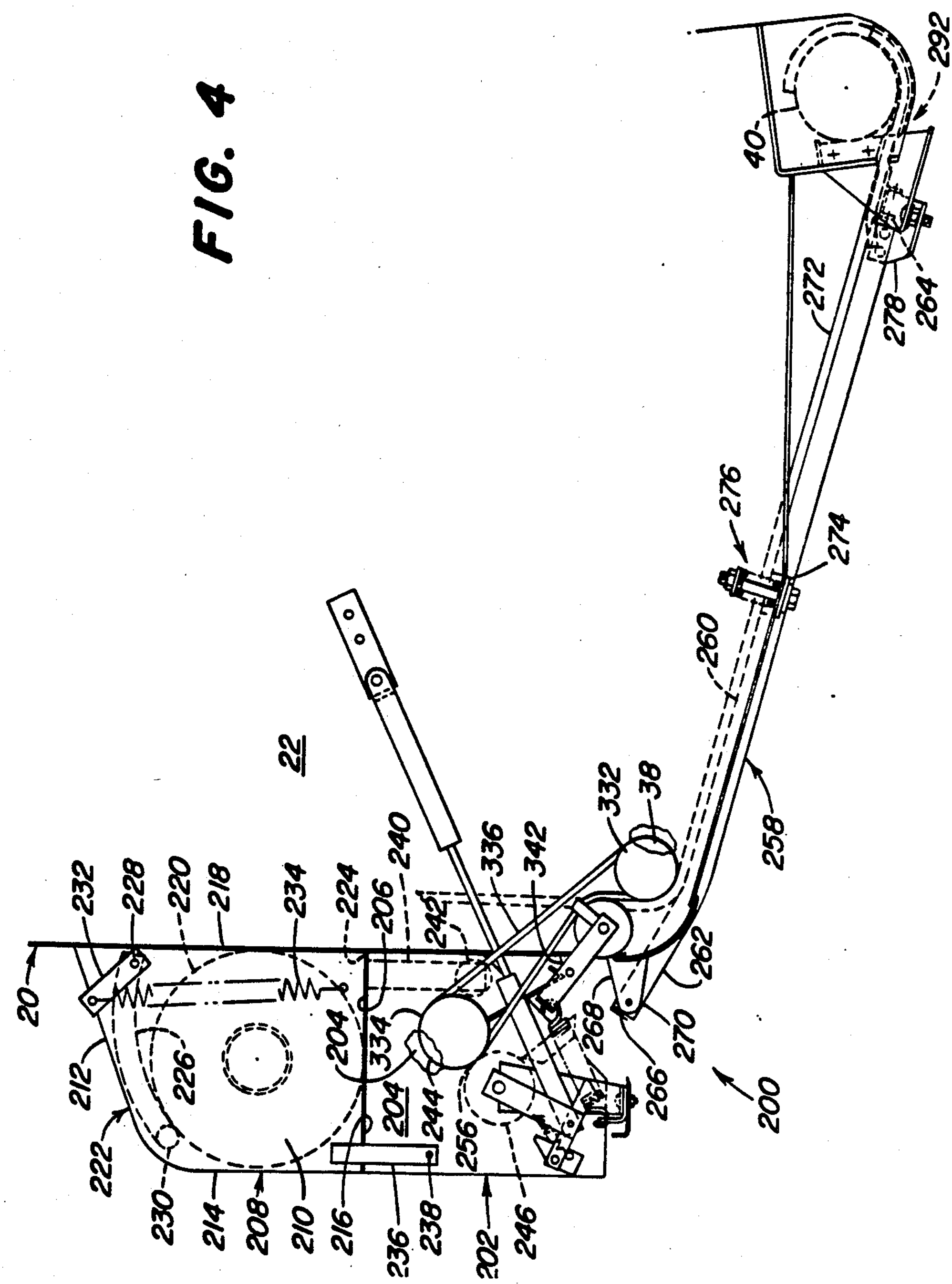
FIG. 4 is an enlarged right side elevational view of the wrap mechanism shown in FIG. 1 for applying a wrap material such as plastic sheet or net to a bale.
Figure 5:
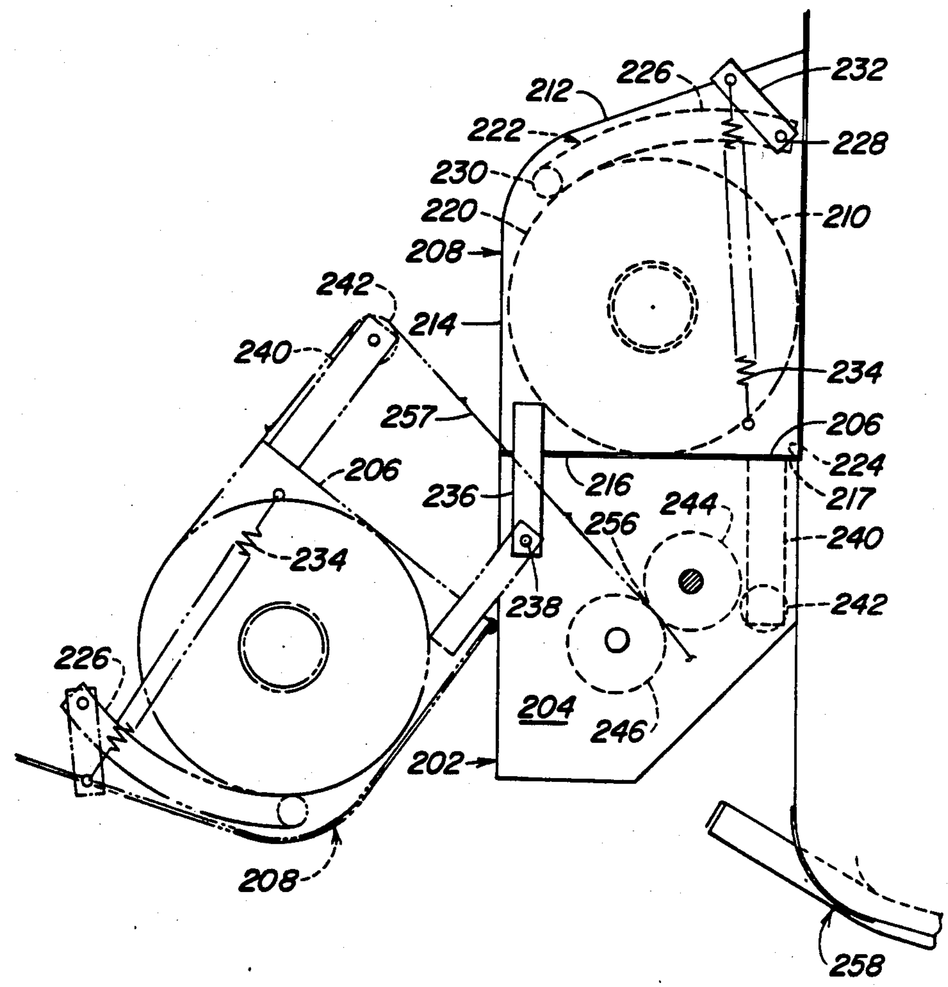
FIG. 5 is a right side elevational view showing the mounting of the housing for holding a roll of wrap material with the housing being shown in a solid line, closed position and in a broken line, open position.
Figure 9:
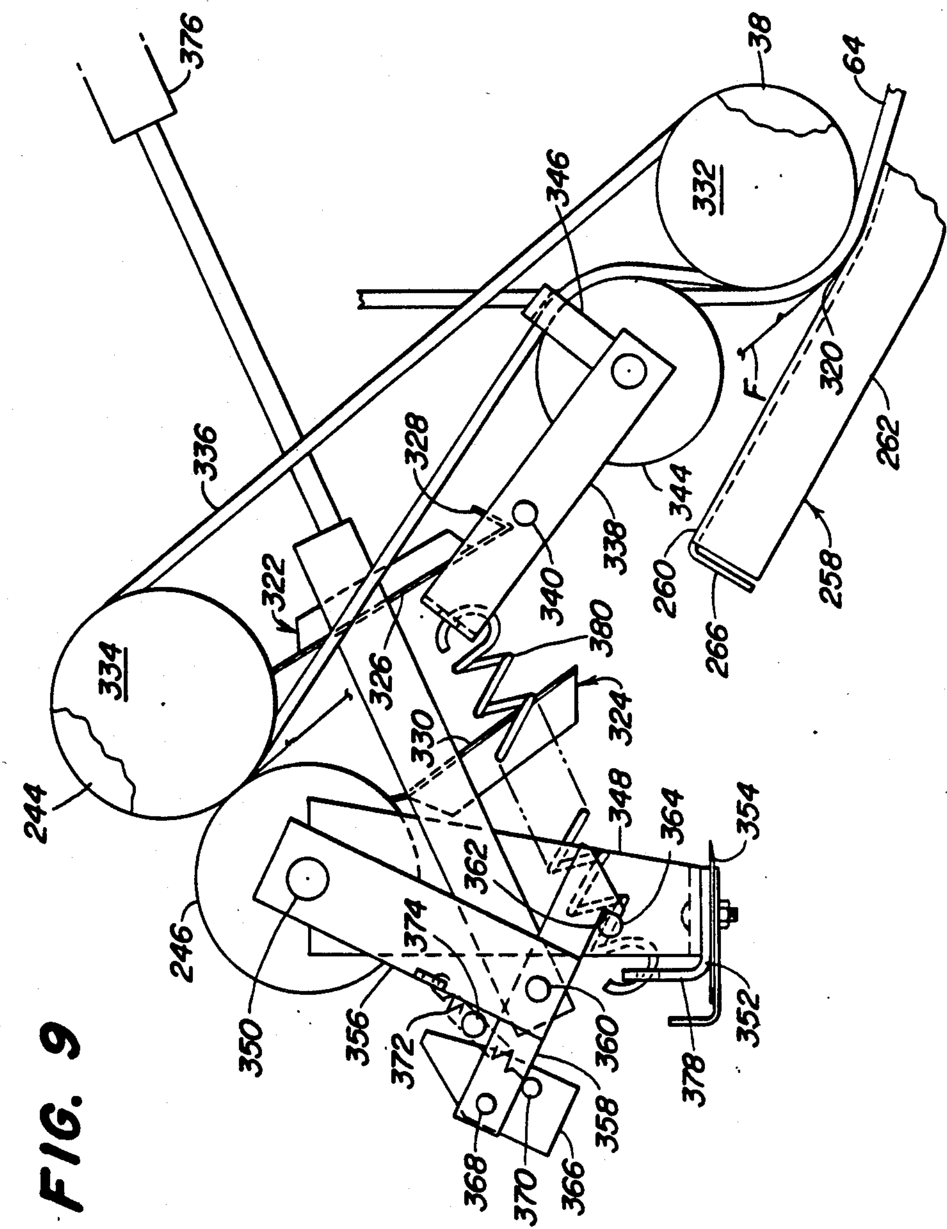
FIG. 9 is a right side elevational view, with structure omitted for clarity, showing the wrapping material cut-off and feeding mechanisms respectively in their cocked and driving conditions.

Referring also to FIGS. 2-4, it can be seen that the baler 10 is provided both with a twine tie mechanism 100, shown mainly in FIG. 3, but also in FIG. 2 and with a wrapping mechanism 200, shown partially in FIG. 4, for applying a wrapping such as plastic or net to a bale.

The twine tie mechanism 100 is like that disclosed in U.S. Pat. No. 4,437,399 granted to Koning on Mar. 20, 1984. Specifically, the mechanism 100 includes (FIG. 2) a twine arm 102 which is mounted for oscillating about an upright shaft 103 supported by the frame 12 in a location chosen so the arm will dispense twine across the entrance to the bale chamber 68 so that twine is fed into the chamber with the crop and pulled from the arm as a result of being fed between the bale and the belts 64. A hydraulically operated twine arm cylinder 104 is coupled through gearing 106 to the twine arm 102 for swinging the arm from the left to the right side of the baler through extension of the cylinder and for returning the twine arm to left side of the baler through retraction of the cylinder. Operation of the cylinder is initiated automatically in response to a bale reaching a desired diameter within the bale chamber 68. The sensing of bale growth in the chamber 68 is accomplished through the action of a link 108 (FIGS. 1 & 3) coupled between an arm 110, which is coupled for swinging in concert with the tensioning arms 44, and a crank arm 112 coupled to the frame 12. An adjustable lost-motion link 114 (FIG. 3) is coupled between the arm 112 and a lower end of latch control link 118 pivoted at 120 and carrying a latch hook 122 releasably engaged over a latch plate 124 formed on one limb of an idler control crank arm 126. An idler biasing spring 128 extends between the crank arms 112 and 126. Thus when the crank arm 112 is swung clockwise by the action of rod 108 in response to a bale increasing in diameter in the bale chamber, the spring is tensioned. This movement of the crank arm 112 eventually causes the link 114 to come to the end of its lost-motion whereupon the link acts to release the latch hook 122 from the plate 124. The tensioned spring 128 then acts through the crank arm 126 and a link 130 coupled between the arm 126 and an idler pulley arm 132 to swing the idler pulley arm and associated idler pulley 134 upwardly to bring the pulley 134 into tensioning engagement with a drive belt 136 extending between a drive pulley 138 and a driven pulley 140. A pump 142 is coupled to be driven together with the pulley 140 and is hydraulically coupled, in a manner detailed below, for supplying fluid to the twine arm cylinder 104 by way of a two position, flow reversing valve 144. A valve control arm 146 has a base 148 formed from a plate that is pivotally attached to the upper end of a spool 150 of the valve. The arm 146 is shown in solid lines (FIG. 3) in a position A which it occupies during formation of a bale. The valve is then in a condition for effecting retraction of the cylinder 104 which is already retracted at this time. A spring 152 is coupled between the arm 146 and the crank arm 112 by way of a link 154 and becomes tensioned in response to clockwise movement of the crank arm during bale growth to effect movement of the arm 146 to its position B against a stop 156 wherein it positions the valve spool 150 for routing fluid for effecting extension of the cylinder 104 once the bale reaches the desired diameter for effecting the tripping of the latch hook 122 and engagement of the drive for the fluid supply pump 142. Movement of the arm 146 to its position B is ensured by a latch 158 pivotally mounted at 160 and including an upper end defined by a stop finger 162 engaged with the underside of the base of the arm 146. Pivoting of the latch 158 so as to remove the finger 162 from beneath the arm base so as to permit movement of the arm 146 to its position C for establishing a condition in the spool for routing fluid for retracting the cylinder 104 is automatically effected by an assembly including a rearwardly biased control rod 164 having a rear end coupled to the latch 158 and a downturned forward end 166 disposed for being contacted and shifted forwardly by the outer end of the twine arm 102 as the end sweeps a path adjacent to the right side of the baler. A spring 168 is coupled to the arm 146 for aiding its movement to position C once the stop finger 162 is removed.

As can best be seen in FIGS. 1 and 4–10, the wrapping mechanism 200 includes a frame 202 including opposite vertical sidewalls 204 provided with forward vertical flanges bolted or otherwise secured to corresponding flanges forming vertical rear ends of the gate sidewalls 22. Tops of the sidewalls 204 are defined by horizontal flanges 206. A wrap material supply roll box or housing 208 has opposite sidewalls 210 joined together by a downwardly and rearwardly sloping top wall 212, a vertical rear wall 214 and a horizontal bottom wall 216 which terminates short of the front of the housing for defining a wrap material passage 217. The front of the housing 208 is closed by a vertical panel 218 extending between and joined to the gate sidewalls 22. Resting on the bottom wall 216 of the housing 208 is a supply roll of wrap material 220 which is biased, by means of a U-shaped structure 222, toward a corner 224 defined by the juncture of a plane containing the bottom wall 216 and the panel 218. The U-shaped structure 222 includes a pair of arms 226 having forward ends respectively pivotally connected to upper forward locations of the sidewalls 210, as at pivots 228, and having rearward ends joined together by a crossbar 230 which engages an upper rear area of the roll of wrap material. A rearwardly projecting arm 232 is mounted to the right pivot 228 for rotation with the arm 226 and a spring 234 is coupled between the arm 232 and the right sidewall 210 so as to urge the crossbar 230 against the roll of wrap material 220. The housing 208 is mounted to the sidewalls 204 by a pair of straps 236 depending from lower rear locations of the sidewalls 210 and respectively coupled to the sidewalls 204 by pivots 238. Thus, the housing 208 may be pivoted rearwardly about the pivots 238 to a lowered open loading position, as shown in dashed lines in FIG. 5, permitting loading of a new roll of wrap. It is to be noted that such loading is not only facilitated by the fact that the open position of the housing makes it unnecessary to lift a roll of wrap material a great distance above the ground but also because the biased U-shaped structure 222 makes it unnecessary to manipulate the roll of wrapping material onto end supports as is the case with known supply roll support structures.

A pair of spreader roll support legs 240 is secured to and depend from inner, lower front locations of the housing sidewalls 210. Extending between and rotatably mounted to the bottoms of the legs 240 is a wrap material spreader roll 242 comprising a cylindrical roll having spiral flighting (not shown) at opposite ends thereof and with the spirals being of opposite hands for acting on the wrap material to "feed" the opposite edges thereof toward the opposite sidewalls 204. When the housing 208 is in its closed dispensing position, as shown in solid lines in FIG. 5, for example, the spreader roll 242 is disposed for rotation about an axis located forwardly of and below the axis of rotation of a forward wrap material drive roll 244 which is rotatably supported in the opposite sidewalls 204. A rear portion of the periphery of the spreader roll 242 is located very close to and slightly beneath a forward portion of the periphery of the drive roll 244. A rear wrap material drive roll 246 extends between and has opposite ends rotatably supported by the sidewalls 204 at a location below and rearwardly of the axis of rotation of the front drive roll 244. The drive rolls 244 and 246 include respective elastomeric surfaces which are in tight frictional engagement with each other so as to define a pinch point 256 for gripping wrap material fed therebetween. After a new roll of wrap material 220 has been loaded into the open housing 208, a length 257 of the wrap material is pulled from the roll, placed over the spreader roll 242 and manually fed into the drive rolls 244 and 246. The housing 208 is then closed resulting in the length of wrap material 257 being tightly wrapped about approximately three-fourths of the periphery of the drive roll 244.

A wrap material guide pan 258 is provided for guiding wrap material exiting from the drive rolls 244 and 246 towards the bale chamber inlet 70. The guide pan 258 is preferably constructed of a material capable of presenting a low friction surface for guiding the wrap material. Stainless steel and some plastics, for example, exhibit this characteristic. The pan 258 shown here is preferably formed from a rectangular blank of stainless steel sheet and includes a rectangular main section 260 having opposite depending side flanges 262, a front flange 264 and a rear flange 266. The pan 258 is mounted between lower portions of the gate sidewalls 22. A pair of brackets 268 project rearwardly from the lower rear locations of the sidewalls 22 and are pivotally joined to rear ends of the pan side flanges 262 by a pair of axially aligned pins 270. The main section 260 of the pan has a smooth upper surface engaged with bale-forming belt portions 272 extending between the lower rear and lower front rolls 38 and 40, respectively, carried by the gate 20. Joined to the opposite pan side flanges 262 at locations medially of the front and rear ends of the pan are tabs 274 which project outwardly beneath the opposite gate sidewalls 22. A pair of spring assemblies 276 are coupled between the sidewalls 22 and the tabs 274 and act to bias the pan upwardly about the pivot pins 270 to yieldably hold the section 260 of the pan in engagement with the bale-forming belt portions 272. The forward end of the pan, as best seen in FIGS. 6 & 7, terminates rearwardly of the roll 40 and respectively coupled to the forward ends of the side flanges 262 are depending brackets 278 having outturned bottom ends 280 extending parallel to the pan upper surface and inturned forward ends 282 spaced forwardly of and extending parallel to the pan front flange 264. A pair of brackets 284 is respectively secured to the interior of the gate sidewalls 22 at locations just rearwardly of the roll 40 and have respective outturned bottom ends 286 spaced vertically above and extending parallel to the outturned bottom ends 280 of the brackets 278. The bracket bottom ends 280 and 286 at each side of the baler are provided with aligned holes and received in the aligned holes is a bolt 288 secured to the bracket bottom end 286 by a nut 290 located between the lower bracket ends 280 and 286. The bolt 288 has a hole therein located below the bracket ends 280 and containing cotter pin 291. The distance between the bottom of the nut 290 and the cotter pin 291 is such as to permit the guide pan 258 to pivot downwardly about the pins 270 in the event that stray crop or a foreign object such as a stone finds its way between the pan 258 and the belt portions 272, such pivoting permitting the stray crop or foreign object to move along the pan without seriously inhibiting the progress of or damaging the wrap material.

A guide finger assembly 292 is fixed ahead of the pan 258 for guiding wrap material exiting from the front of the pan around the roll 40 a distance sufficient for the material to be grabbed at a pinch point 294 formed by the bale-forming belts 64 and the bale 76. Specifically, the guide finger assembly 292 comprises a downwardly opening, transverse channel member 296 having a web forming a coplanar extension of the upper pan surface, having a rear leg 298 secured to the pan front flange 264 by a plurality of transversely spaced fasteners 300 and having a front leg 301 having opposite ends secured to the fronts of the inturned forward ends 282 of the brackets 278 by a pair of fasteners 302. Spaced across and secured to the channel member 296 at locations corresponding to gaps 304 (FIG. 8) between the bale-forming belts 64 are a plurality of guide fingers 306. The guide fingers 306 are formed of rods which are circular in cross section and have a diameter approximately equal to the thickness of the bale-forming belts 64. Considered from rear to front, each finger 306 includes a rear end section 308 angled upwardly and forwardly through a forward location of the main pan section 260, a straight section 310 welded across the web of the channel member 296, an upwardly offset section 312 extending partly above the belts 64, a second straight section 314 extending partly below the belts 64 and parallel to the straight section 310 and a forward end section 316 curved arcuately about the bottom and lower front peripheral portions of the roll 40 and having its entire length partly radially outwardly of the belts 64. It will thus be appreciated that the fingers 306 are shaped and mounted so as to not impede the progress of wrap material as it exits the guide pan 258 while directing the wrap material around the roll 40 to the pinch point 294. At the same time, the fingers 306 act to keep the belts 64 in proper alignment so that they will apply an even pull across the width of the wrap material during wrapping of a bale 76.

That portion of the wrap material guide pan 258 which projects rearwardly beyond the gate 20 includes an upper surface 318 located beneath a flight path F (FIG. 9) extending tangentially to the drive rolls 244 and 246 and intersecting the pan section 260 approximately at a pinch point 320 defined between the pan and the bale-forming belts 64 where the latter pass around the bale-forming belt support roll 38. Respectively associated with the drive rolls 244 and 246 are sheet metal wrap material guides 322 and 324 which extend between and are secured to the sidewalls 204. The guide 322 includes a flat guide portion 326 extending forwardly from the periphery of the drive roll 244 and is located above and generally parallel to the flight path F. For a purpose explained below, the forward end of the guide 322 is upwardly angled, as at 328. The guide 324 includes a flat guide portion 330 extending forwardly from the periphery of the drive roll 246 in general parallelism to and below the flight path F.

The drive rolls 244 and 246 are selectively driven by a drive including a drive pulley 332 fixed on a right end extension of a support shaft of the bale-forming belt support roll 38 and a driven pulley 334 fixed on a right end extension of a support shaft of the forward drive roll 244. A drive belt 336 is trained about the pulleys 332 and 334. Located adjacent a lower rear run of the belt 336 is an idler pulley support arm 338 which is mounted, as at a pivot 340, to a bracket 342 (FIG. 4) secured to the rear of the gate right sidewall 22. An idler pulley 344 is rotatably mounted to one end of the arm 338. Fixed to the arm 338 and extending over the pulley 344 and the lower run of the belt 336 is a U-shaped belt guide 346. The idler pulley 344 is shown in a drive establishing position wherein it presses upwardly against the lower run of the belt 336. A pair of wrap cut-off blade support arms 348 is respectively pivotally mounted to axial extensions 350 at the opposite ends of rear drive roll 246. Lower ends of the arms 348 are inturned and secured thereto is a blade or knife support 352 to which is secured a wrap cut-off blade or knife 354. Also pivotally mounted to the right extension 350 is a latch support arm 356 having a strap-like latch element 358 attached thereto by a pivot connection 360. The forward end of the latch element 358 defines a downwardly facing hook surface 362 which is releasably engaged over a latch pin 364 projecting outwardly from the right blade support arm 348. A cam tab 366 is pivotally connected to the rear end of the latch element 358 by a pin 368. A stop pin 370 is fixed to the tab 366 and engages the element 358 for limiting counterclockwise rotation of the tab relative to the element. A spring 372 is coupled between the stop pin 370 and the latch support arm 356 and normally holds the stop pin 370 against the element 358 while at the same time biasing the hook surface 362 against the latch pin 364. A guide or trip pin 374 projects from the right sidewall 204 at a location just ahead of the cam tab 366. An extensible and retractable hydraulic cylinder 376 has its head end coupled to the gate right sidewall 22 and has its rod end coupled to the pivot connection 360 and acts, when extended as shown, through the latch arm 356 and the latch element 358 to hold the knife support arms 348 in a cocked condition, as shown in FIG. 3. Coupled between a bracket 378, forming a rightward extension of the blade support 352, and a rear end of the idler pulley support arm 338 for maintaining the idler pulley 344 in drive establishing engagement with the belt 336 whenever the cylinder 372 is holding the knife support arms in their cocked condition is a coil spring 380. Upon the latch element 358 being released from the latch pin 364 by an initial amount of retraction of the rod of the cylinder 376, the spring 380 acts to swing the blade support arms 348 counterclockwise from their cocked position, shown in FIG. 9, to the wrap cut-off position, shown in FIG. 10, wherein the blade 354 lies adjacent a forward surface of the angled end 328 of the wrap material guide 222. The spring 380 also acts, when moving to its collapsed condition shown in FIG. 10, to cause clockwise movement of the idler pulley support arm 338 and hence the pulley 344 so as to slacken the drive belt 336 so as to disengage the drive to the drive rolls 244 and 246. This action of the spring 380 also causes the belt 336 to become kinked, as at 382, by the belt guide 346 which acts to brake the rotation of the drive rolls to prevent them from dispensing wrapping material any time during the drive to the drive rolls is disengaged.

Figure 11:
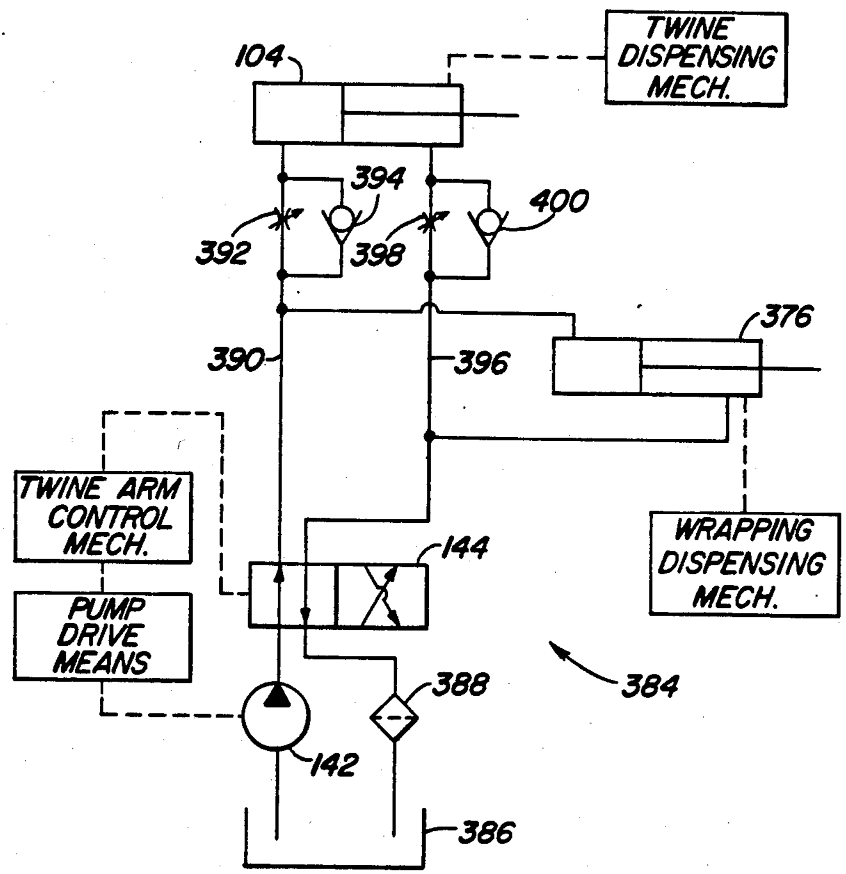
FIG. 11 is a schematic view of the hydraulic control circuitry embodying the control cylinder shown in FIG. 10.

Referring now to FIG. 11, it can be seen that the cylinder 376 is incorporated in a hydraulic circuit 384 for automatically cycling the twine arm cylinder 104. Specifically, the hydraulic circuit 384 includes the pump 142 having an inlet coupled to a sump 386 and an outlet coupled to the reverser valve 144, the latter being coupled for returning fluid to the sump 386 via a filter 388. The valve 144 is coupled to the head end of the twine arm control cylinder 104 by a conduit 390 containing a variable restrictor 392 operative for setting the rate of retraction of the cylinder 104. A one-way valve 394 is coupled to the conduit 390 in bypassing relationship to the restrictor 392 for permitting free flow to the head end of the cylinder 104 while forcing return flow to go through the restrictor. The valve 144 is coupled to the rod end of the twine arm control cylinder 104 by a conduit 396 containing a variable restrictor 398 for setting the rate of extension of the cylinder 104. A one-way valve 400 is coupled to the conduit 396 in bypassing relationship to the restrictor 398 for permitting free flow of fluid to the rod end of the cylinder 104 while forcing return flow to go through the restrictor. The hydraulic cylinder 376 of the wrapping mechanism 200 is coupled to the conduits 390 and 396 in parallel with the cylinder 104 at respective locations between the restrictors 392 and 398 and the reversing valve 144. This establishes unrestricted flow to and from the wrapping control cylinder 376 so that the cylinder 376 will cycle faster than the cylinder 104.

Figure 10:
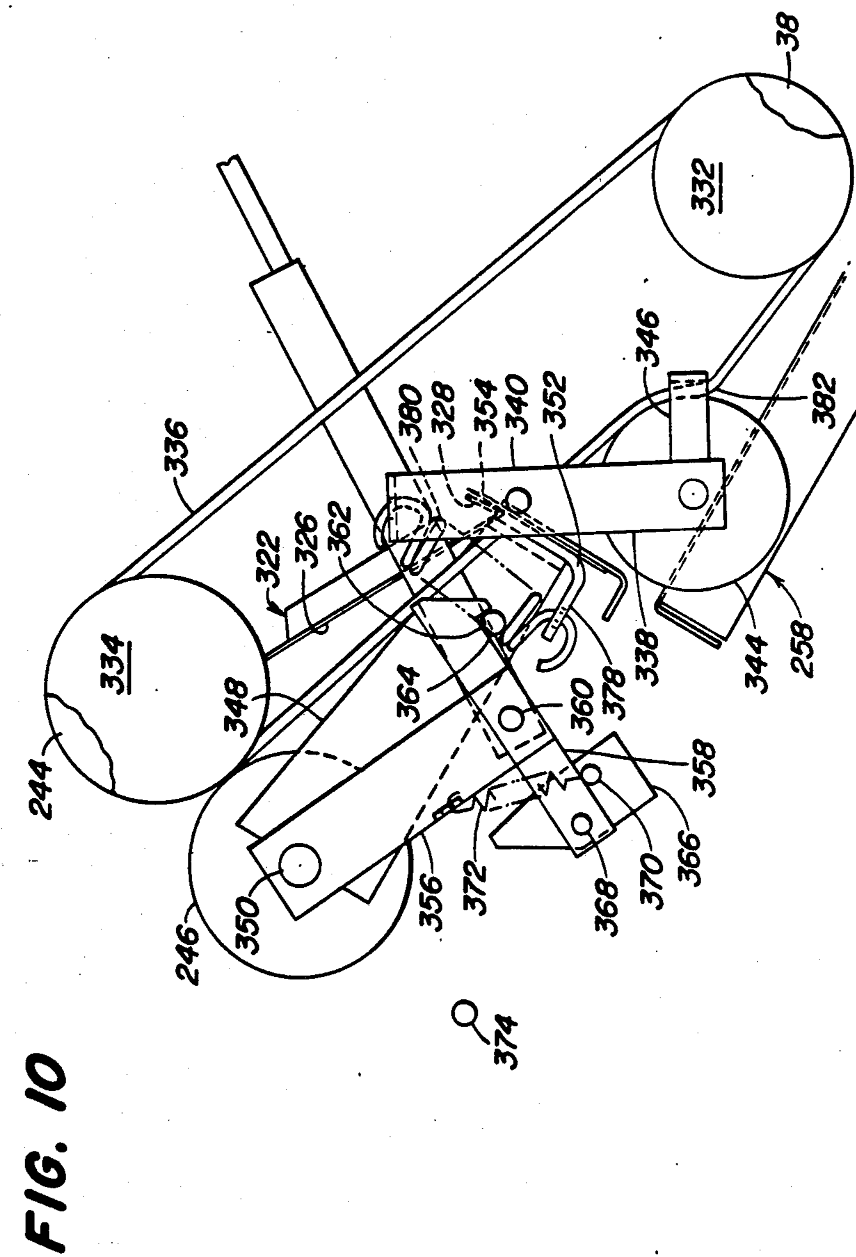
FIG. 10 is a view like FIG. 9 but showing the wrapping material cut-off and feeding mechanisms respectively in their released cutting and non-driving conditions and with the knife latch control cylinder being shown in a retracted position wherein it has once again brought the latch into engagement with a stop carried by the knife support arm.

In operation, the cylinders 104 and 376 will initially be in their respective retracted positions shown in FIGS. 2 & 10. At this time, the pump drive will be disconnected as shown in solid lines in FIG. 3 and the drive roll drive will be disconnected as shown in FIG. 10. Upon the bale 76 reaching a preselected diameter within the bale chamber 68, the link 108 will have rotated the crank arm 112 counterclockwise a distance sufficient to act through the lost-motion link 114 to effect release of latch 122 from the latch plate 124. The spring 128 will then operate to effect engagement of the pump drive and the pump 142 will begin delivery of fluid to the respective head ends of the twine arm cylinder 104 and the wrapping mechanism control cylinder 376. The cylinder 376 will quickly extend and act through the latch element 358 to shift the knife support arm 348 to its cocked position shown in FIG. 9. The spring 380 will be tensioned at the same time so that it acts through the idler pulley support arm 338 to bias the idler pulley 344 against the belt 336 and establish the drive to the drive rolls 244 and 246. The rotating drive rolls will then deliver an end of the roll of wrap material to the top surface 260 of the guide pan 258 and to the pinch point 320 between the bale-forming belts 64 and pan surface 260. The belts 64 then carry the wrap material to the guide finger assembly 292 where the fingers 306 act to support and guide the material about the bale-forming belt support roll 40 toward the pinch point 294 established at the juncture of the periphery of the bale 76 and the belts 64. The wrap material will then be carried by the rotating bale 76. It is here noted that the linear speed at the periphery of the rotating bale 76 is a preselected amount greater than the linear speed at the periphery of the drive rolls 244 and 246 which results in a tensioning of the wrap material within its yield limit so that it is stretched over the bale 76. Thus, once the wrap material is engaged by the rotating bale, the drive rolls 244 and 246 act as a brake to develop a desired tension in the wrap material. The large amount of peripheral contact of the wrap material with the drive roll 244 diminishes the tendency of the wrap material to slip relative to the surfaces of the drive rolls as a result of the tension developed in the wrap material.

Meanwhile, the twine arm cylinder 104 has been extending at a preselected rate established by the setting of the variable restrictor 398. This setting is chosen in accordance with the number of wraps of the wrap material that is desired to be applied to the bale 76. As the twine arm cylinder reaches its fully-extended condition, the twine arm 102 engages the downturned end 166 of the control rod 164 which acts through the lever 158 to remove the stop finger 162 from beneath the base 148 of arm 146 so as to permit the valve spool 150 to be moved to its alternate position by the spring 168 to thus establish a reversal of the flow in the conduits 390 and 396. This reversal of flow causes the cylinders 104 and 376 to retract. As the cylinder 376 begins to retract, it brings the cam tab 366 of the latch element 358 into contact with the guide pin 372 resulting in the latch surface 362 being disengaged from the pin 364 so as to release the knife arm 348. The tensioned spring 380 then collapses and propels the arms 348, and the knife 354 carried thereby, counterclockwise about the shaft extension 350. The cutting edge of the knife 354 engages the tensioned wrap material and cuts it as the blade passes adjacent the angled end 328 of the material guide 324. At the same time, the collapsed spring 380 acts through the idler pulley arm 338 to disengage the drive roll drive and to kink the belt 336 through means of the belt guide 346 so as to brake the rotation of the drive rolls 244 and 246 and prevent the further feeding of the wrap material. The twine arm cylinder 104 again travels slower than the cylinder 376 due to the action of the restrictor 392, the latter being set so that sufficient time elapses to permit the cut-off wrap material to be wrapped upon the bale before the twine arm reaches its starting position. The operator then operates the gate cylinders 92 to open the gate 20 to discharge the wrapped bale 76. With the bale 76 gone from the chamber 68 the tension arm support shaft 46 will rotate counterclockwise resulting in clockwise movement of the bell crank 112 to relax the spring 128 and disengage the pump drive. At the same time the latch plate 124 of the idler control crank arm 126 is once again engaged by the latch 122. The link 154 and spring 152 act to restore the valve control arm 146 to its starting position A while the rearwardly biased rod 164 has operated to once again place the stop finger 162 beneath the base 148 of arm 146. The wrapping cycle is then complete.

We claim:

1. In a large round baler including a first device for wrapping a bale located in a bale-forming chamber with twine, said first device having a control circuit including:

(a) a sump;

(b) a pump;

(c) a double acting twine arm cylinder for moving a twine arm between first and second laterally spaced locations adjacent the bale-forming chamber;

(d) a twine arm cylinder control means coupled to the pump, sump and cylinder for selectively cycling the cylinder for moving the twine arm from its first to its second location and then back to the first location when a bale of a desired size is located in the bale-forming chamber, the improvements comprising: a second device for alternatively wrapping a bale with a wrap material having a width substantially commensurate with said chamber, the second device including:

(i) a pair of selectively drivable wrap material drive rolls for feeding wrap material toward said chamber when driven;

(ii) normally disengaged drive means coupled to one of said pair of drive rolls;

(iii) a double-acting hydraulic wrapper feed control cylinder coupled to said drive means for establishing engagement thereof only during movement of the wrapper control cylinder in a first direction; and said wrapper control control cylinder being coupled to the twine arm cylinder control means in parallel with said twine arm cylinder for moving in said first direction when the twine arm cylinder is operated to move the twine arm from its first to its second location.

2. The large round baler defined in claim 1 wherein said second device further includes:

(iv) sequencing control means for causing the control cylinder to cycle ahead of the twine arm cylinder.

3. The large round baler defined in claim 1 wherein the second device also includes:

(v) a wrap material cut-off means including a cut-off blade movable between a cocked position away from the wrap material and a cutting position across a flight path extending tangent to the drive rolls;

(vi) biasing means connected to the cut-off blade for biasing the latter to its cutting position only when it is in its cocked position; and (vii) latch means coupled to the control cylinder and selectively engageable with the cutting blade for moving it to its cocked position upon movement of the control cylinder in said first direction and for releasing the cutting blade for operation by the biasing means during movement of the control cylinder in a second direction opposite to the first direction, whereby the control cylinder controls both the drive means and the cut-off blade means.

4. The large round baler defined in claim 3 wherein the biasing means forms a sole connection between the control cylinder and the drive means.

5. In a large round baler including a first device for automatically wrapping a bale with twine in response to the bale reaching a preselected diameter in a bale-forming chamber, said first device having a control circuit including:

(a) a sump;

(b) a pump;

(c) a twine arm cylinder for moving a twine arm across the chamber from a first to a second location upon extension of the cylinder and for returning the twine arm to the first location upon retraction of the cylinder;

(d) a reversing valve hydraulically coupled to the sump, pump and opposite ends of the cylinder and movable between first and second positions for respectively effecting extension and retraction of the cylinder;

(e) a reversing valve control mechanically coupled for moving the reversing valve to its second position only when the twine arm cylinder is fully extended;

(f) a normally disengaged pump drive coupled to the pump; and (g) a pump drive control coupled to the pump drive for automatically effecting engagement thereof only in response to the existence of a bale of said preselected diameter in said chamber, the improvement comprising: a second device for alternatively automatically wrapping a bale with a wrap material having a width commensurate with said chamber, the second device including:

(i) a pair of selectively drivable wrap material drive rolls for feeding wrap material toward said chamber when driven;

(ii) normally disengaged drive means coupled to one of said pair of drive rolls;

(iii) a normally contracted extensible and retractable hydraulic control cylinder coupled to said drive means for establishing engagement thereof only during extension of the control cylinder; and said control cylinder being coupled to said reversing valve in parallel with said twine arm cylinder; and (iv) flow restrictor means coupled between the reverser valve and the twine arm cylinder for causing the control cylinder to extend and retract ahead of the twine arm cylinder and for regulating the rate of movement of the twine arm cylinder to ensure proper wrapping of a bale by the second device.

6. The large round baler defined in claim 5 wherein the second device also includes:

(v) a wrap material cut-off means including a cut-off blade movable between a cocked position away from the wrap material and a cutting position across a flight path extending tangent to the drive rolls;

(vi) biasing means connected to the cut-off blade for biasing the latter to its cutting position only when it is in its cocked position; and (vii) latch means coupled to the control cylinder and selectively engageable with the cutting blade for moving it to its cocked position upon extension of the control cylinder and for releasing the cutting blade for operation by the biasing means during retraction of the control cylinder, whereby the control cylinder controls both the drive means and the cut-off blade means.

7. The large round baler defined in claim 6 wherein the biasing means forms a sole connection between the control cylinder and the drive means.

* * * * *